United States Patent
Teboulle et al.

(10) Patent No.: US 10,505,666 B2
(45) Date of Patent: Dec. 10, 2019

(54) GATEWAY CONFIGURATION METHOD

(71) Applicant: SAGEMCOM ENERGY & TELECOM SAS, Rueil Malmaison (FR)

(72) Inventors: Henri Teboulle, Rueil Malmaison (FR); Paolo Moro, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 51 days.

(21) Appl. No.: 15/778,769

(22) PCT Filed: Nov. 15, 2016

(86) PCT No.: PCT/EP2016/077708
§ 371 (c)(1),
(2) Date: May 24, 2018

(87) PCT Pub. No.: WO2017/089177
PCT Pub. Date: Jun. 1, 2017

(65) Prior Publication Data
US 2018/0343083 A1    Nov. 29, 2018

(30) Foreign Application Priority Data
Nov. 25, 2015    (FR) ...................... 15 61345

(51) Int. Cl.
*H04L 1/00*    (2006.01)
*H04W 88/16*    (2009.01)
(Continued)

(52) U.S. Cl.
CPC ......... *H04L 1/0017* (2013.01); *H04B 17/318* (2015.01); *H04B 17/336* (2015.01);
(Continued)

(58) Field of Classification Search
None
See application file for complete search history.

(56) References Cited

U.S. PATENT DOCUMENTS

| 2009/0042593 | A1 | 2/2009 | Yavuz et al. |
| 2016/0029248 | A1* | 1/2016 | Syed ............... H04W 28/08 370/235 |

(Continued)

FOREIGN PATENT DOCUMENTS

| EP | 0 544 095 | 6/1993 |
| EP | 0 709 983 | 5/1996 |

(Continued)

OTHER PUBLICATIONS

International Search Report and Written Opinion of the ISA for PCT/EP2016/077708, dated Jan. 13, 2017, 13 pages.
(Continued)

*Primary Examiner* — Faruk Hamza
*Assistant Examiner* — Cassandra L Decker
(74) *Attorney, Agent, or Firm* — Nixon & Vanderhye, P.C.

(57) ABSTRACT

A method for configuring communication parameters for a first gateway of a LoRa network, designated by a server of said network to relay a response to a request, containing data, received by the server, the data originating from a terminal of said network, the response being transmitted by the server and intended for the terminal. The method comprises, when it is implemented by the first gateway: acquiring communication parameters; and, configuring the first gateway so as to transmit the response to the terminal using said parameters; said parameters being acquired by a determination procedure determining (52, 53, 54), when a distance between the first gateway and a second gateway is shorter than a threshold, communication parameters that make it possible to ensure reliable transmission from the first (Continued)

Figure 1:
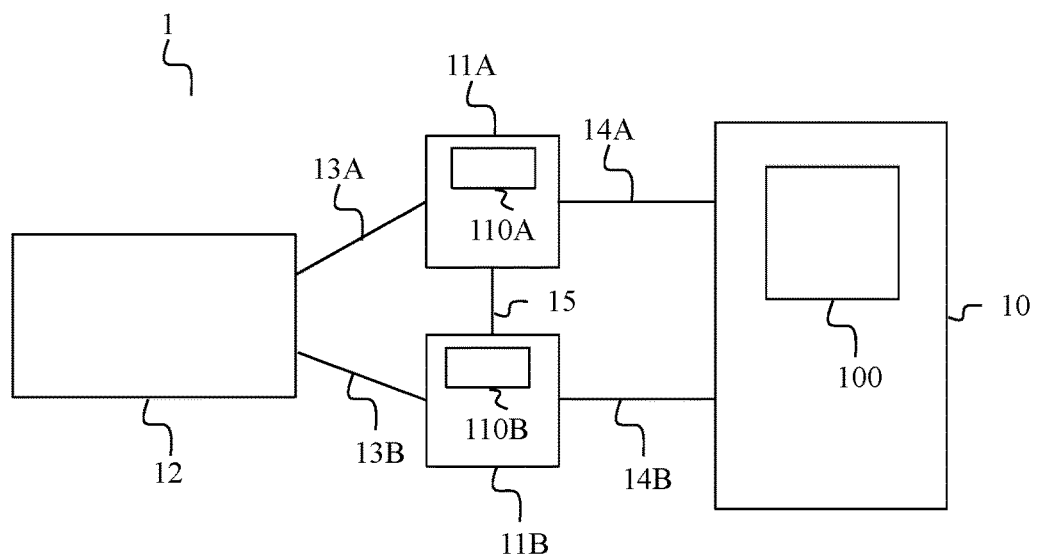

gateway to the terminal and to minimize disturbance, by said transmission, of communications from the second gateway.

8 Claims, 3 Drawing Sheets

(51) Int. Cl.
*H04W 4/02* (2018.01)
*H04B 17/318* (2015.01)
*H04B 17/336* (2015.01)
*H04W 16/10* (2009.01)

(52) U.S. Cl.
CPC ............. *H04L 1/0003* (2013.01); *H04W 4/02* (2013.01); *H04W 88/16* (2013.01)

(56) References Cited

U.S. PATENT DOCUMENTS

2016/0261306 A1* 9/2016 Seller ............... H04W 56/0015
2018/0024828 A1* 1/2018 Nogueira-Nine ....... G06F 8/654
                                                                717/173

FOREIGN PATENT DOCUMENTS

EP        1 806 856      7/2007
WO      2004/112325     12/2004

OTHER PUBLICATIONS

Sornin et al., "LoRa MAC Specification; LTN(14)011004_LoRa_MAC_Specifications", ETSI Draft; LTN(14)011004_LoRa_MAC_Specifications, Jan. 16, 2014 European Telecommunications Standards Institute (ETSI), vol. ISG, Jan. 16, 2014, pp. 1-23.

* cited by examiner

GATEWAY CONFIGURATION METHOD

This application is the U.S. national phase of International Application No. PCT/EP2016/077708 filed 15 Nov. 2016, which designated the U.S. and claims priority to FR Application No. 1561345 filed 25 Nov. 2015, the entire contents of each of which are hereby incorporated by reference.

The invention relates to a method for configuring communication parameters for a gateway in a low-power wide-area wireless network, to a device and to a system implementing the method.

The Internet is gradually transforming into a wide network, called 'Internet of Things', that links all sorts of objects that have become connectable. New requirements in terms of networks have thus emerged, in particular requirements in terms of wireless networks having greater coverage than conventional cellular networks and that allow power consumption of the connected devices to be limited. Among these low-power wide-area wireless networks (LPWAN), mention may be made of networks based on LoRa (registered trademark) ('Long Range') technology. LoRa technology operates on frequency bands known by the name 'ISM Band' (Industrial, Scientific and Medical), containing frequency bands that are able to be used freely for industrial, scientific and medical applications. LoRa technology is based on a spread spectrum technology that makes it possible to achieve low-throughput communications having good robustness in a particularly noisy ISM band.

A network based on LoRa technology (called 'LoRa network' hereinafter) is formed of base stations or gateways that are generally positioned at high points so as to cover a large geographical area. The gateways are able to detect messages sent in their area by devices or terminals (or endpoints) and to route them to at least one centralized server (LoRa Network Server (LNS)) that will process them.

In a LoRa network, a device is not attached to a gateway. All of the gateways within the range of a terminal may serve as a relay between said terminal and the centralized server. If a gateway manages to decode a message sent by a terminal (uplink), then it retransmits said message to the centralized server for processing. If a message has to be transmitted from a centralized server to said terminal (downlink), it is the centralized server that will take responsibility for determining which gateway has to relay the message.

FIGS. 4A, 4B, 4C, 5A, 5B and 5C illustrate the spread spectrum technology that is applied to a binary data signal.

Figure 4A:
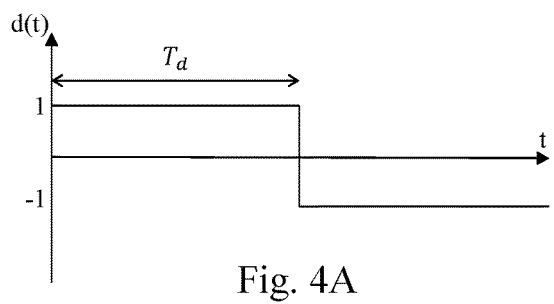

FIG. 4A schematically illustrates a binary data signal d(t) to which spectrum spreading has to be applied. In the example of FIG. 4A, the signal d(t) takes voltage values '1' or '−1', the voltage value '1' indicating a binary '1', the voltage value '−1' indicating a binary '0'. The signal d(t) has a bit period $T_d$.

Figure 4B:
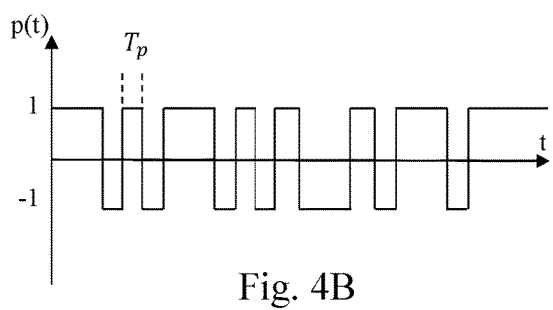

FIG. 4B schematically illustrates a pseudorandom binary signal p(t) used in the spectrum spreading. In the example of FIG. 4B, the signal p(t) takes voltage values '1' or '−1', the voltage value '1' indicating a binary '1', the voltage value '−1' indicating a binary '0'. The signal p(t) has a bit period $T_p$, where the bit period $T_p$ is much smaller than the bit period $T_d$. It is noted that the signal p(t) is sometimes called spread signal.

Figure 4C:
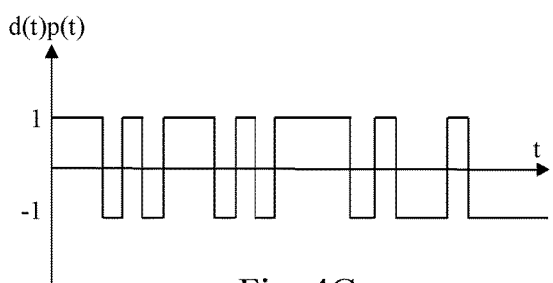

FIG. 4C schematically illustrates a signal acquired following application of spectrum spreading to the binary data signal d(t). During the spectrum spreading, the signal d(t) is combined with the spread signal p(t): a combination of a voltage value '1' with a voltage value '1' gives a voltage value '1'; a combination of a voltage value '1' with a voltage value '−1' gives a voltage value '−1'; a combination of a voltage value '−1' with a voltage value '−1' gives a voltage value '1'. The signal resulting from the spectrum spreading, denoted d(t)p(t), has a bit period $T_p$ when the bit period $T_d$ is a multiple of the bit period $T_p$.

Figure 5A:
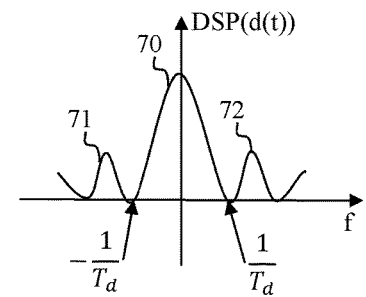

FIG. 5A schematically illustrates a power spectral density of the binary data signal d(t). The power spectral density, denoted DSP(d(t)), takes the form of a main lobe 70 centered on a central frequency and having a frequency bandwidth of $$\frac{2}{T_d},$$

surrounded by secondary lobes (71, 72) having a frequency bandwidth of $$\frac{1}{T_d}.$$

Figure 5B:
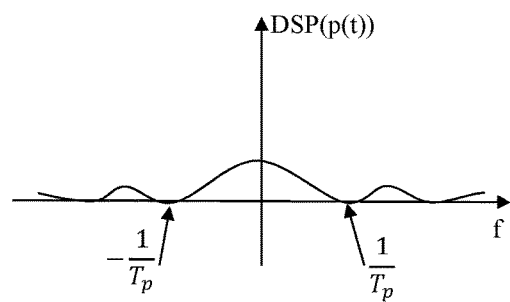

FIG. 5B schematically illustrates a power spectral density of the pseudorandom binary data signal p(t). The power spectral density, denoted DSP(p(t)), takes the form of a main lobe centered on a central frequency and having a frequency bandwidth of $$\frac{2}{T_p},$$

surrounded by secondary lobes having a frequency bandwidth of $$\frac{1}{T_p}.$$

Figure 5C:
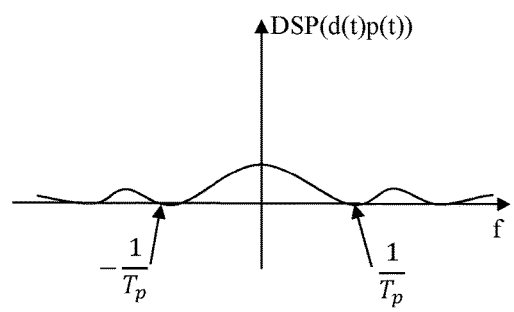

FIG. 5C schematically illustrates a power spectral density of the binary data signal to which spectrum spreading has been applied. The power spectral density, denoted DSP(d(t)p(t)), takes the form of a main lobe centered on a central frequency and having a frequency bandwidth of $$\frac{2}{T_p},$$

surrounded by secondary lobes having a frequency bandwidth of $$\frac{1}{T_p}.$$

It is noted that, following application of the spectrum spreading to the binary data signal d(t), the signal d(t)p(t) retains the same power as the signal d(t), but distributed over a larger frequency band.

Figure 6:
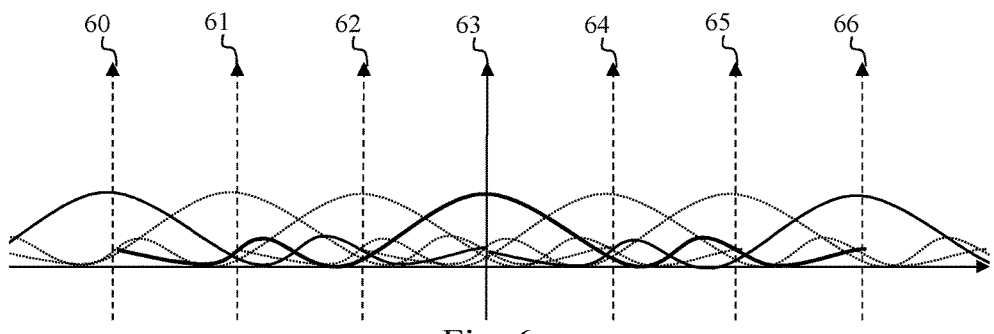

FIG. 6 schematically illustrates the power spectral densities of a set of channels that are available in a LoRa network. LoRa technology defines a set of channels, each channel being associated with a central frequency of a set of central frequencies of the ISM band that are able to be used in LoRa networks, termed set of LoRa central frequencies.

The set of LoRa central frequencies is shown in the table TAB 1 below, each frequency being expressed in MHz.

TAB 1

| | | | | | | |
|---|---|---|---|---|---|---|
| 863.1 | 864.1 | 865.1 | 866.1 | 867.1 | 868.1 | 869.05 |
| 863.3 | 864.3 | 865.3 | 866.3 | 867.3 | 868.3 | 869.525 |
| 863.5 | 864.5 | 865.5 | 866.5 | 867.5 | 868.5 | |
| 863.7 | 864.7 | 865.7 | 866.7 | 867.7 | 868.85 | |
| 863.9 | 864.9 | 865.9 | 866.9 | 867.9 | | |

Each channel is associated with a power spectral density centered on one of the central frequencies of the set of LoRa central frequencies. The central frequencies 60 to 66 that are shown in FIG. 6 are consecutive central frequencies of the set of LoRa central frequencies. As is able to be seen in FIG. 6, the power spectral densities that are associated with two consecutive central frequencies, for example the central frequencies 63 and 64, broadly overlap. There is therefore a non-negligible risk of a communication in a spectral band centered on a first central frequency being impacted by interference brought about by communications in spectral bands centered on second central frequencies close to the first central frequency. For example, a communication in a spectral band centered on the central frequency 63 would be impacted by interference brought about by a communication in a spectral band centered on the central frequency 62 or the central frequency 64.

Such an interference problem may arise when a plurality of geographically close gateways have not been configured appropriately in terms of central frequencies, but also in terms of transmission strength (or level), or else in terms of modulations that are used. Specifically, if these two gateways use spectral bands centered on close central frequencies, there is a non-negligible chance of their communications interfering.

Moreover, it is known that the ISM band has characteristics (error rates, signal-to-noise ratio, bandwidth, etc.) that vary very rapidly and are unpredictable. As data transmission in a LoRa network takes place in the form of frames, it is not unusual for a period of variation of the characteristics of a LoRa network to be of the order of a duration of one or a few frames.

It is desirable to mitigate these drawbacks of the prior art. It is desirable in particular to propose a method that allows to configure a gateway of a LoRa network by taking account of a geographical proximity of said gateway to other gateways. It is additionally desirable for this method to be reactive enough to take account of the rapid variations of the characteristics of the LoRa network.

It is moreover desirable to propose a method that is easy to implement and inexpensive.

According to a first aspect of the present invention, the present invention relates to a method for configuring, in a low-power wide-area wireless network, communication parameters of a gateway, termed first gateway, designated by a server of said network to relay information representative of a response to a request, containing data, received by the server, the data originating from a terminal of said network, the information representative of a response being transmitted by the server and intended for the terminal. The method comprises, when it is implemented by the first gateway: acquiring parameters for communication between said first gateway and said terminal; and, configuring the first gateway so as to transmit the information representative of a response using each communication parameter acquired; the communication parameters being acquired by a determination procedure comprising: acquiring at least one item of information representative of a distance between the first gateway and at least one second gateway; when at least one second gateway is situated at a distance from the first gateway that is shorter than a predefined distance, determining communication parameters that allow to ensure reliable transmission from the first gateway to the terminal and to minimize disturbance, by said transmission, of communications from each second gateway situated at a distance from the first gateway that is shorter than the predefined distance.

A risk of the communications from two close gateways mutually disturbing one another is thus minimized, as this principle is applied to all of the gateways.

According to one embodiment, said network is based on LoRa technology, the data originating from the terminal coming from a frame, termed uplink frame, that is transmitted in multicast mode by the terminal and received by a set of gateways comprising at least the first gateway, and the information representative of a response is transmitted by the first gateway to the terminal in a frame, called downlink frame.

According to one embodiment, the communication parameters comprise a central frequency, and determination of the central frequency to be used by the first gateway to transmit the information representative of a response consists in selecting, from among a set of predefined central frequencies, a central frequency having a gap between central frequencies, which are used by each second gateway situated at a distance from the first gateway that is shorter than the predefined distance, larger than a predefined gap.

According to one embodiment, the communication parameters furthermore comprise a modulation and/or a transmit level, and the modulation and/or the transmit level are determined using information representative of a quality of reception, which information is measured when the uplink frame is received by the first gateway, and comprising an item of information representative of a received signal strength indication RSSI and an item of signal-to-noise ratio SNR information.

According to one embodiment, determination of the modulation consists in selecting, from among a set of modulations, each modulation of said set being associated with a bit rate, a minimum admissible reception sensitivity and a minimum acceptable signal-to-noise ratio, a modulation associated with the highest possible bit rate and meeting each criterion from among a first and a second criterion, the first criterion being such that the item of information representative of a received signal strength indication RSSI has to be such that:

$$RSSI \geq (S + C_{RSSI})$$

where S is the minimum admissible reception sensitivity associated with said modulation and $C_{RSSI}$ is a first predefined constant and the second criterion being such that the item of signal-to-noise ratio SNR information has to be such that:

$$SNR \geq (A + C_{SNR})$$

where A is the minimum acceptable signal-to-noise ratio associated with said modulation and $C_{SNR}$ is a second predefined constant.

According to one embodiment, when a modulation has been able to be selected, the transmit level POWE is determined in the following way:

$$POWE = \max(N_{max} - \min((SNR - (A + C_{SNR}), (RSSI - (S + C_{RSSI})), N_{min})$$

where $N_{max}$ is a predefined maximum transmit level, $N_{min}$ is a predefined minimum transmit level, min(x,y) is a function taking the minimum between a value x and a value y, max(x,y) is a function taking the maximum between the value x and the value y.

According to one embodiment, the determination procedure is implemented by said server, the information representative of a quality of reception being transmitted to the server by said first gateway, and each communication parameter determined by the determination procedure is transmitted by the server to the first gateway.

According to one embodiment, the distance information is determined on the basis of information representative of a geographical location of the first gateway and of each second gateway received by the server.

According to one embodiment, in the determination procedure, the determination of the central frequency is implemented by the first gateway, the determination of the modulation and of the transmit level being implemented by the server or by the first gateway.

According to one embodiment, the distance information is determined on the basis of information representative of a geographical location of the second gateways received by the first gateway.

According to one embodiment, each item of information on the geographical location of a second gateway has been transmitted in a frame by a second gateway that has measured said item of geographical location information, said second gateway temporarily acting as a terminal to transmit said frame.

According to one embodiment, prior to the transmission of the frame comprising an item of geographical location information, the second gateway that has to transmit said frame has implemented an identification procedure enabling it to identify itself to other gateways belonging to said network comprising the first gateway, said identification procedure being based on a transmission of a signature representative of said gateway and able to be recognized by each gateway of said network in the form of a predefined series of empty frames, each empty frame being transmitted with a predefined transmit level.

According to one embodiment, communication parameters are acquired for each uplink frame transmitted by the terminal and relayed by the first gateway or at regular intervals, a duration of each interval being able to be set or adjusted depending on statistics regarding a rate of variation of characteristics of a frequency band used by said network.

According to a second aspect of the invention, the invention relates to a device for determining communication parameters for a gateway, termed first gateway, with a terminal, the first gateway and the terminal being contained in a low-power wide-area wireless network. The device comprises: acquisition means for acquiring at least one item of information representative of a distance between the first gateway and at least one second gateway; and, determination means, implemented when at least one second gateway is situated at a distance from the first gateway that is shorter than a predefined distance, for determining communication parameters that allow to ensure reliable transmission from the first gateway to the terminal and to minimize disturbance, by said transmission, of communications from each second gateway situated at a distance from the first gateway that is shorter than the predefined distance.

According to a third aspect of the invention, the invention relates to a system for configuring, in a low-power wide-area wireless network, communication parameters for a gateway, termed first gateway, designated by a server of said network to relay information representative of a response to a request, containing data, received by the server, the data originating from a terminal of said network, the information representative of a response being transmitted by the server and intended for the terminal. The system comprises: acquisition means for acquiring parameters for communication between said first gateway and said terminal; and, configuration means for configuring the first gateway so as to transmit the information representative of a response using each communication parameter acquired; and, a device according to the second aspect.

According to a fourth aspect of the invention, the invention relates to a computer program comprising instructions for the implementation, by a device, of the method according to the first aspect when said program is executed by a processor of said device.

According to a fifth aspect of the invention, the invention relates to storage means storing a computer program comprising instructions for the implementation, by a device, of the method according to the first aspect when said program is executed by a processor of said device.

Figure 2A:
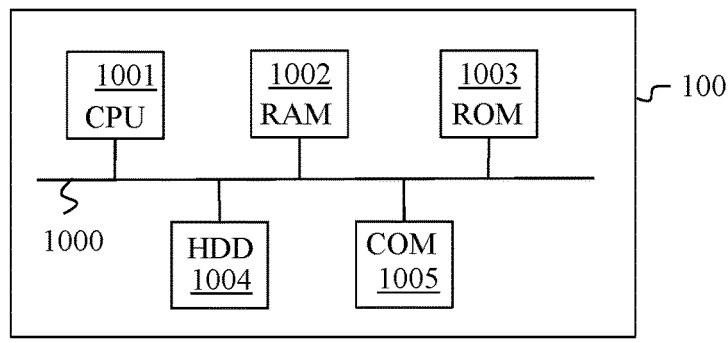
Figure 2B:
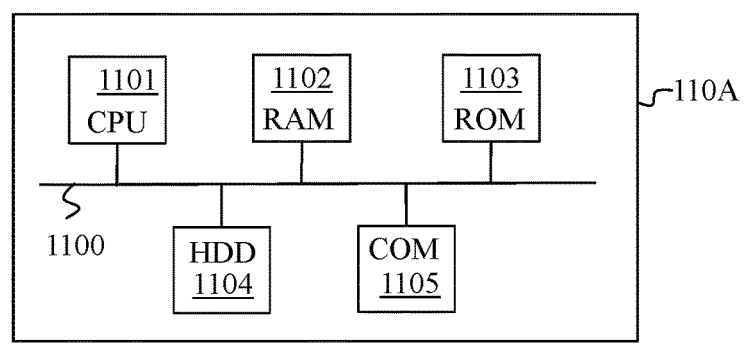
Figure 3A:
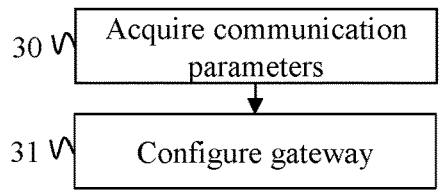
Figure 3B:
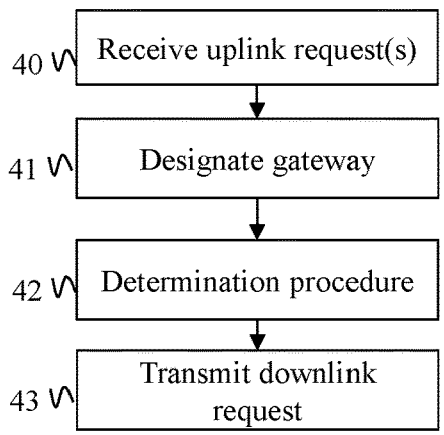
Figure 3C:
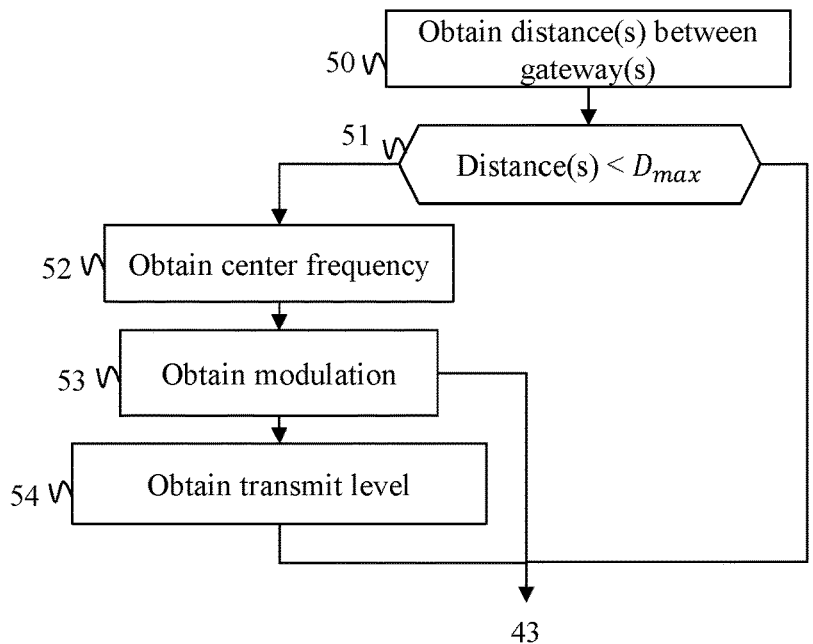

The features of the invention that are mentioned above, along with others, will emerge more clearly upon reading the following description of an exemplary embodiment, said description being given with reference to the appended drawings, in which:

FIG. 1 schematically illustrates a LoRa network in which the invention is implemented;

FIG. 2A schematically illustrates a processing module contained in a server;

FIG. 2B schematically illustrates a processing module contained in a gateway;

FIG. 3A schematically illustrates a method for configuring a gateway according to the invention;

FIG. 3B schematically illustrates a method implemented by a server when data originating from a terminal are received;

FIG. 3C schematically illustrates a procedure for determining communication parameters according to the invention;

FIG. 4A schematically illustrates a binary data signal to which spectrum spreading has to be applied;

FIG. 4B schematically illustrates a pseudorandom binary signal used in the spectrum spreading;

FIG. 4C schematically illustrates a signal acquired following application of spectrum spreading to the binary data signal;

FIG. 5A schematically illustrates a power spectral density of the binary data signal;

FIG. 5B schematically illustrates a power spectral density of the pseudorandom binary signal;

FIG. 5C schematically illustrates a power spectral density of the binary data signal to which spectrum spreading has been applied; and, FIG. 6 schematically illustrates the power spectral densities of a set of channels that are available in a LoRa network.

The invention is described hereinafter in a LoRa network context. However, the invention applies in other contexts for all types of low-power wide-area wireless networks in which the communications use spread spectrum technology.

FIG. 1 schematically illustrates a LoRa network 1 in which the invention is implemented.

In the example of FIG. 1, the LoRa network 1 comprises a server 10, two gateways 11A and 11B and a terminal 12. The gateway 11A (respectively the gateway 11B) communicates with the server 10 by way of a wired or wireless communication link 14A (respectively 14B). The gateway 11A (respectively the gateway 11B) communicates with the terminal 12 by way of a wireless communication link 13A (respectively 13B).

The server 10 comprises a processing module 100. The gateway 11A (respectively 11B) comprises a processing module 110A (respectively 110B).

In one embodiment, the gateways 11A and 11B are able to communicate with one another by way of a wireless communication link 15. To this end, each gateway that wishes to communicate with another gateway uses a functionality offered by the LoRaWAN protocol, which is that of allowing a gateway to temporarily act as a terminal.

It is noted that the communications between the terminals and the gateways and the communications between the gateways of a LoRa network use frames that are compatible with the LoRaWAN protocol, the frames being transmitted in multicast (or broadcast) mode. The document LoRaWAN 1.1 (draft LoRaWAN 1.1) of August 2015 defines the communications between the terminals and the gateways of a LoRa network.

It is moreover assumed hereinafter that the channels (and therefore the central frequencies and spectral bands) used by the gateways 11A and 11B in the network 1 to communicate with the terminal 12 are different from the channels used by the terminal 12 to communicate with the gateways 11A and 11B.

FIG. 2A schematically illustrates an exemplary hardware architecture for the processing module 100 contained in the server 10.

According to the exemplary hardware architecture shown in FIG. 2A, the processing module 100 then comprises, linked by a communication bus 1000: a processor or CPU (central processing unit) 1001, a random access memory (RAM) 1002; a read-only memory (ROM) 1003; a storage unit such as a hard disk or a storage medium reader, such as an SD (secure digital) card reader 1004; at least one communication interface 1005 enabling the processing module 100 to communicate with other modules or devices. For example, the communication interface 1005 enables the processing module 100 to communicate with other modules of the server 10 or with other devices, such as the gateways 11A and 11B.

The processor 1001 is capable of executing instructions loaded in the RAM 1002 from the ROM 1003, from an external memory (not shown), from a storage medium (such as an SD card), or from a communication network. When the server 10 is powered up, the processor 1001 is capable of reading instructions from the RAM 1002 and of executing them. In one embodiment, these instructions form a computer program implementing the complete or partial implementation, by the processor 1001, of the methods described hereinafter with reference to FIGS. 3B and 3C.

The methods described with reference to FIGS. 3B and 3C may be implemented in software form through the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 2B schematically illustrates an exemplary hardware architecture for the processing module 110A contained in the gateway 11A. The processing module 110B is identical.

According to the exemplary hardware architecture shown in FIG. 2B, the processing module 110A then comprises, linked by a communication bus 1100: a processor or CPU (central processing unit) 1101, a random access memory (RAM) 1102; a read-only memory (ROM) 1103; a storage unit such as a hard disk or a storage medium reader, such as an SD (secure digital) card reader 1104; at least one communication interface 1105 enabling the processing module 110A to communicate with other modules or devices. For example, the communication interface 1105 enables the processing module 110A to communicate with the server 10 or with the gateway 11B.

The processor 1101 is capable of executing instructions loaded in the RAM 1002 from the ROM 1003, from an external memory (not shown), from a storage medium (such as an SD card), or from a communication network. When the gateway 11a is powered up, the processor 1101 is capable of reading instructions from the RAM 1102 and of executing them. In one embodiment, these instructions form a computer program implementing the complete or partial implementation, by the processor 1101, of the methods described hereinafter with reference to FIGS. 3A and 3C.

The methods described with reference to FIGS. 3A and 3C may be implemented in software form through the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 3B schematically illustrates a method implemented by a server when data originating from a terminal are received.

In the example of FIG. 3B, it is assumed that the terminal 12 has transmitted a frame intended for the server 10. This frame, termed uplink frame, has been transmitted in multicast mode, such that each gateway within the range of the terminal 12 has received this uplink frame. In the example of the LoRa network 1, it is assumed that the gateways 11A and 11B receive each uplink frame transmitted by the terminal 12. When a gateway of a LoRa network receives an uplink frame intended for a server, it decodes said frame and inserts data contained in this uplink frame into an HTTP (Hypertext Transfer Protocol) request, termed uplink HTTP request, and then transmits this uplink HTTP request to the server of the LoRa network in point to point mode.

In a step 40, the processing module 100 of the server 10 receives at least one HTTP request containing the data contained in the uplink frame. In the example of FIG. 1, the server 10 therefore receives two uplink HTTP requests, one originating from the gateway 11A and the other originating from the gateway 11B. When the processing module 100 receives the uplink HTTP requests, it processes said requests.

In a step 41, the processing module 100 designates one gateway from among the gateways that have relayed the uplink frame to relay information representative of a response to the uplink frame to the terminal 12. To this end, the server 10 uses a designation procedure based, for example, on a comparison of information representative of a quality of reception, which information is measured when the uplink frame is received by each gateway that has relayed the uplink frame. The information, thus measured, representative of a quality of reception has been transmitted to the server 10 by the gateways 11A and 11B, for example by inserting this information into the uplink HTTP requests in a JSON (JavaScript Object Notation) format. The server designates for example the gateway 11A having a better quality of reception than the gateway 11B. In one embodiment, the information representative of a quality of reception comprises a received signal strength indication (RSSI), the received signal corresponding to the uplink frame, and a signal-to-noise ratio (SNR) measured on said signal. The designated gateway may therefore, for example, be the gateway associated with the highest received signal strength indication value, or with the highest signal-to-noise ratio value, or for which a metric that combines the received signal strength indication value and the signal-to-noise ratio value is at a maximum.

In a step 42, the processing module 100 implements a determination procedure to determine communication parameters that have to be used by the designated gateway (in this case the gateway 11A). A description of the determination procedure is given hereinafter with reference to FIG. 3C.

In a step 43, the processing module 100 transmits a response in point to point mode in the direction of the terminal 12. A single response is transmitted in the direction of the terminal 12 for all of the uplink HTTP requests concerning the same uplink frame. However, it is to be noted that the LoRaWAN protocol allows, in a programmable manner, to repeat a frame a certain number of times (this number typically being equal to 2, that is to say 3 transmissions of the same frame at most in this case), and this, independently, in the uplink direction and in the downlink direction. Information representative of the response is inserted by the server 10 into an HTTP request, termed downlink HTTP request, and the downlink HTTP request is transmitted in point to point mode to the gateway designated by the server 10. In the example of FIG. 1, the downlink HTTP request is transmitted to the gateway 11A.

In an exemplary implementation of the method described with reference to FIG. 3B, the uplink frame transmitted by the terminal 12 is a request to attach to the LoRa network 1. This request, called JOIN REQUEST in the LoRaWAN protocol, is then relayed by each gateway situated within the range of the terminal 12 (in the example of FIG. 1, the frame containing the attachment request is relayed by the gateways 11A and 11B) by encapsulating it in each generated uplink HTTP request. When the server accepts the terminal 12 joining the LoRa network 1, the downlink HTTP request transmitted by the server 10 encapsulates a downlink frame, called JOIN ACCEPT, authorizing the terminal 12 to attach to the LoRa network 1. The downlink frame is then transmitted in multicast mode by the gateway 11A and the terminal 12 receives said frame.

When it receives the downlink HTTP request transmitted by the server 10, the processing module 110A of the gateway 11A decodes said request and applies a method described hereinafter with reference to FIG. 3A.

FIG. 3A schematically illustrates a method for configuring a gateway according to the invention.

In a step 30, the processing module 110A acquires parameters for communication between said gateway 11A and said terminal 12. Each transmission, by the gateway 11A, of downlink frames in the direction of the terminal 12 after step 30 has to use the parameters acquired, and to do this for as long as the processing module 110A does not acquire new communication parameters. When, as indicated with reference to the example of FIG. 3B, the server 10 implements the determination procedure (corresponding to step 42), the communication parameters have been determined by the processing module 100 of the server 10. In this embodiment, the communication parameters are transmitted to the gateway 11A in the downlink HTTP request containing the information representative of a response.

In one embodiment, the communication parameters are inserted into the downlink HTTP request in the JSON format.

In one embodiment, the communication parameters comprise a central frequency that has to be used by the gateway 11A.

In one embodiment, the communication parameters furthermore comprise a modulation and/or a transmit level that have to be used by the gateway 11A.

In a step 31, the processing module 110A configures the gateway 11A such that the information representative of a response is transmitted to the terminal 12 using each communication parameter acquired.

In one embodiment, the designated gateway acquires communication parameters for each uplink frame transmitted by the terminal 12 that it has relayed. Thus, the gateway may potentially acquire new communication parameters for each downlink frame that it has to transmit to a terminal, thereby ensuring very good reactivity in the face of the rapid variations of the characteristics of the ISM band.

In one embodiment, the designated gateway acquires communication parameters at regular intervals, for example every second or every minute or every hour. A duration of the interval between two acquisitions of communication parameters may then be set or adjusted depending on statistics regarding the rate of variation of the characteristics of the ISM band, thereby allowing to reduce a cost in terms of computation power of determining communication parameters.

FIG. 3C schematically illustrates a procedure for determining communication parameters according to the invention.

As seen above with reference to step 42 of FIG. 3B, in one embodiment, the procedure for determining communication parameters is implemented by the processing module 100 of the server 10.

In a step 50, the processing module 100 acquires at least one item of information on the distance between the gateway 11A and at least one other gateway, i.e. the gateway 11B in the network 1. In the example of FIG. 1, the processing module 100 acquires an item of information on the distance between the gateway 11A and the gateway 11B.

In one embodiment, the processing module knows information on the geographical location of each gateway of the network 1, and deduces from this the distances between each gateway of the network 1 taken in pairs. This information was for example acquired when these gateways were installed and transmitted by an installer to the server 10. In one embodiment, each gateway has a geographical location module (for example a GPS (global positioning system) module) and is capable of transmitting, to the server 10, geographical location coordinates (longitude, latitude, altitude) that it has measured. These geographical location coordinates may for example be inserted into an uplink HTTP request in JSON format, the uplink HTTP request being able to be transmitted at any time by each gateway of the network 1, for example when it is installed or upon request from the server.

In one embodiment in which a LoRa network includes a larger number of gateways, the processing module 100 could receive distance information comprising a distance between the designated gateway and each other gateway of the LoRa network, or a distance between the designated gateway and a set of gateways near the designated gateway in the LoRa network.

In a step 51, the processing module 100 compares each distance acquired with a predefined distance. The predefined distance is a distance such that two gateways situated at a distance shorter than the predefined distance could mutually disturb their respective communications. When at least one gateway of a LoRa network is situated at a distance from the designated gateway that is shorter than the predefined distance, the processing module 100 determines, in steps 52, 53 and 54, communication parameters that allow to ensure reliable transmission from the designated gateway to the terminal 12 and to minimize disturbance, by said transmission, of communications from the gateways of the LoRa network that are situated at a distance from the designated gateway that is shorter than the predefined distance. In the example of FIG. 1, steps 52, 53 and 54 are implemented when the distance between the gateway 11A and the gateway 11B is shorter than the predefined distance. In one embodiment, the predefined distance is equal to "200 m".

As has been seen above, communications in LoRa networks use spread spectrum technology. Each of the "31" channels defined by the LoRa technology is associated with a power spectral density centered on a central frequency. Two geographically close gateways may mutually disturb one another if they transmit in close frequency bands, that is to say when their power spectral densities have a significant overlap. It is therefore preferable for close gateways to have power spectral densities that do not overlap or overlap slightly. It is possible to control the overlap between the power spectral densities associated with gateways by controlling a gap between their central frequencies.

In step 52, the processing module 100 acquires the central frequency received by each of the gateways situated at a distance from the designated gateway that is shorter than the predefined distance. In one embodiment, each uplink HTTP request transmitted by a gateway that has relayed the data contained in the uplink frame sent by the terminal 12 comprises an item of information representative of the central frequency received by said gateway. For example, the uplink HTTP requests transmitted by the gateways 11A and 11B comprise an item of information representative of the central frequency received by the gateway 11A and an item of information representative of the central frequency received by the gateway 11B, respectively. This item of information is for example inserted into each uplink HTTP request in JSON format. Independently, the server 10 that programs the central frequencies to be used by each gateway to transmit frames to each terminal of the LoRa network 1 appropriately knows which is the last central frequency used in send mode by each gateway to communicate with each terminal.

Thereafter, in step 52, the processing module 100 selects, from the set of LoRa central frequencies, a central frequency that has a gap between the central frequencies, used by the gateways situated at a distance from the designated gateway that is shorter than the predefined distance, that is greater than a predefined gap. In one embodiment, the predefined gap is equal to "3" MHz. In the example of FIG. 1, if the central frequency associated with the gateway 11B is equal to "863.1" MHz, the processing module 100 chooses a central frequency higher than "866.1" MHz, thereby leaving "15" possible central frequencies in the set of LoRa central frequencies.

Optionally, it is possible to act on communication parameters other than the central frequency. Among the parameters that can be adjusted in a LoRa communication, and outside of the central frequency, it is possible to act on a modulation and/or a transmit level that are used by the designated gateway to communicate with the terminal 12.

In one embodiment, the modulation and/or the transmit level are determined using the information representative of a quality of reception, which information is measured when the received uplink frame is received by the designated gateway. As has been seen above, this information representative of a quality of reception comprises an item of information representative of a received signal strength indication, represented hereinafter by an RSSI value, and an item of signal-to-noise ratio information, represented hereinafter by an SNR value.

In a step 53, the processing module determines the modulation by selecting, from among a set of modulations, each modulation of said set being associated with a bit rate, a minimum admissible reception sensitivity and a minimum acceptable signal-to-noise ratio, a modulation associated with the highest possible bit rate and meeting each criterion from among a first and a second criterion.

LoRa technology defines '7' possible modulations, which are grouped together in the table TAB 2 below.

TAB 2

| Modulation | Bit rate (Bits/s) | S (minimum admissible reception sensitivity) (dBm) | A (minimum acceptable signal-to-noise ratio) (dB) |
|---|---|---|---|
| MOD 1 | 50000 | −105 | 7.5 |
| MOD 2 | 5489 | −130 | −7.5 |
| MOD 3 | 3125 | −132.5 | −10 |
| MOD 4 | 1758 | −135 | −12.5 |
| MOD 5 | 977 | −137.5 | −15 |
| MOD 6 | 537 | −140 | −17.5 |
| MOD 7 | 293 | −142.5 | −20 |

For example, the first modulation, MOD 1, is associated with a bit rate of 50 Kbits/s, a minimum admissible reception sensitivity S=−105 dBm, and a minimum acceptable signal-to-noise ratio A=7.5 dBm.

The first criterion is such that the item of information representative of a received signal strength indication RSSI has to be such that:

$$RSSI \geq (S + C_{RSSI})$$

where $C_{RSSI}$ is a first predefined constant. In one embodiment, $C_{RSSI}$=25 dBm, this value allowing to have a sufficient margin so as to minimize the risks of retransmission of the frame due to rapid variations in disturbances in the ISM band, which would have detrimental consequences on the load of the network.

The second criterion is such that the item of signal-to-noise ratio information SNR has to be such that:

$$SNR \geq (A + C_{SNR})$$

where $C_{SNR}$ is a second predefined constant. In one embodiment, $C_{RSSI}$=3 dB, this value allowing to have a sufficient margin so as to minimize the risks of retransmission of the frame due to the rapid variations in the disturbances in the ISM band, which would have detrimental consequences on the load of the network. It is thus considered that a transmission with a noise margin <3 dB is not viable.

When a modulation can be selected, the transmit level, represented by a variable POWE, is determined in step 54 in the following way:

$$POWE = \max(N_{max} - \min((SNR - (A + C_{SNR}), (RSSI - (S + C_{RSSI})), N_{min})$$

where $N_{max}$ is a predefined maximum transmit level, $N_{min}$ is a predefined minimum transmit level, min(x,y) is a function taking the minimum between a value x and a value y, max(x,y) is a function taking the maximum between the value x and the value y. In one embodiment $N_{max}$=27 dBm and $N_{min}$, =0 dBm, corresponding to ranges of values that are typically used for gateways in LoRa networks in Europe.

If no modulation is able to be determined, the processing module 100 moves directly to step 43. The downlink HTTP request is transmitted without communication parameters relating to a modulation and to a transmit level. When the designated gateway receives this downlink HTTP request, it does not reconfigure its communication parameters relating to the modulation and to the transmit level, and therefore keeps a modulation and a transmit level that were acquired previously. It is also possible, in a variant of this embodiment, to apply in this case the most robust modulation (the modulation MOD 7 in this case).

When there is no gateway of the LoRa network situated at a distance from the designated gateway that is shorter than the predefined distance, the processing module 100 does not determine new communication parameters and moves directly to step 43. In this case, the downlink HTTP request is transmitted without a communication parameter and the designated gateway receiving this downlink HTTP request reuses communication parameters that were acquired previously. It is also possible, in a variant of this embodiment, to apply in this case the most robust modulation (i.e. MOD 7).

In one embodiment, it is the designated gateway (in this case the gateway 11A), by way of its processing module (110A), which implements the determination procedure described with reference to FIG. 3C. In this embodiment, the processing module 100 of the server 10 implements steps 40, 41 and 43 described with reference to FIG. 3B, and transmits, to the designated gateway, a downlink HTTP request containing the data representative of a response but not comprising communication parameters. The designated gateway receiving this downlink HTTP request implements step 42 during step 30 and therefore itself determines its communication parameters. In this embodiment, the acquisition of the distances between gateways is based on information exchanged between the gateways. It is assumed in this case that the gateways of the LoRa network 1 have exchanged with one another geographical location information that they have measured using a geographical location module. To implement these exchanges, each gateway temporarily acts as a terminal and transmits a frame in multicast mode comprising its geographical location information. Each gateway receiving this frame extracts the geographical location information that said frame contains, determines a distance between it and the gateway that sent this frame, and stores said distance in order to use it in step 50. These frames containing geographical location information may be transmitted for example when the gateway is installed or at regular intervals.

In one embodiment, each gateway of the LoRa network 1 (in this case the gateways 11A and 11B) implements the determination procedure described with reference to FIG. 3C independently of transmission of an uplink frame by the terminal 12. This implementation of the determination procedure may be carried out for example at regular intervals. As in the previous embodiment, in this embodiment, the acquisition of the distances between gateways is based on geographical location information exchanged between the gateways. Thus, in this embodiment, when a designated gateway has to transmit a downlink frame, it transmits said frame with the last communication parameters that it determined. In this embodiment, the gateways of the LoRa network have to distribute the frequencies of the set of LoRa frequencies among themselves. To this end, knowing that each gateway of a LoRa network knows a MAC (media access control) address of each other gateway of the LoRa network, the gateways are able to distribute their central frequencies among one another depending on their MAC address. For example, when two gateways are separated by a distance shorter than the predefined distance, the gateway associated with a lowest MAC address value adopts a higher central frequency than the other gateway.

In one embodiment, steps 50, 51 and 52 of the determination procedure are implemented by the processing module (110A in this case) of the designated gateway (11A in this case) in step 30. Steps 53 and 54, for their part, are implemented by the processing module 100 of the server 10 after step 41. The designated gateway is therefore capable of determining its central frequency, and the server 10 is capable of supplying, to the gateway, a modulation and a transmit level. The server 10 (by way of its processing module 100) and the gateway 11A (by way of its processing module 110A) therefore form a system that implements the method for configuring communication parameters for the gateway 11A.

Up until this point, it has been considered that the LoRa network 1 was not disturbed by another LoRa network. In this case, the configuration of the gateways relates only to the gateways of one and the same network, in this case the gateways 11A and 11B of the LoRa network 1. However, it is possible for at least one other LoRa network to disturb the LoRa network 1. In this case, it may be useful to be capable of identifying the gateways belonging to one and the same network. In this way, in the embodiment in which the gateways exchange geographical location information, a gateway capable of identifying the gateways belonging to the same network is able to recognize the frames containing geographical location information originating from gateways of the same network. Thus, the frames containing geographical location information originating from gateways of the same network may be decoded, while the other frames containing geographical location information are rejected. In one embodiment, each gateway of one and the same network, for example the gateways 11A and 11B of the network 1, applies an identification procedure. This identification procedure may for example be implemented when the gateway is installed or at regular intervals. In this identification procedure, each gateway transmits, in multicast mode, a signature in the form of a series of empty frames. Each empty frame of said series is transmitted with a predefined transmit level. Each empty frame may for example be transmitted with a transmit level that is chosen between two values. The two values of the transmit level may for example be "+14" dBm and "+5" dBm. One of the two transmit levels represents a binary value "1", while the other transmit level represents a binary value "0". The series of empty frames is therefore representative of a binary word that another gateway is able to interpret as the signature of the gateway that sent said series. Specifically, each gateway receiving the series of empty frames is able to measure the transmit level of each empty frame and deduce from this the associated binary word. In this embodiment, each gateway of one and the same LoRa network knows the signatures of the other gateways of the same network or at least the characteristics of these signatures, enabling it to recognize said signatures. In a variant of this embodiment, all of the gateways of one and the same LoRa network have the same signature. A gateway is thus capable of determining, when it receives a series of empty frames, whether or not the gateway that sent said series belongs to the same LoRa network as it. When a first gateway has been identified by a second gateway as belonging to the same LoRa network as a second gateway, the second gateway saves the MAC address of the first gateway and associates this MAC address with an item of information indicating that the first and the second gateways belong to the same LoRa network. In this way, each time the second gateway receives a frame containing geographical location information and including a MAC address corresponding to a gateway belonging to the same LoRa network, it recovers the geographical location information. Otherwise, the second gateway rejects the frame. It is noted that, in this embodiment, all of the exchanged frames (empty frames and frames containing geographical location information) are sent by gateways temporarily acting as terminals.

The invention claimed is:

1. A method for configuring, in a low-power wide-area wireless network based on LoRa (long range) technology, communication parameters for a first gateway designated by a server of said network to relay information representative of a response to a request, containing data, received by the server, the data originating from a terminal of said network, the information representative of a response being transmitted by the server and intended for the terminal, wherein the method comprises, when implemented by the first gateway:
acquiring communication parameters between said first gateway and said terminal; and,
configuring the first gateway so as to transmit the information representative of a response using each communication parameter acquired, the data originating from the terminal coming from an uplink frame that is transmitted in multicast mode by the terminal and received by a set of gateways comprising at least the first gateway, and the information representative of a response is transmitted by the first gateway to the terminal in a downlink frame;
acquiring the communication parameters by applying a determination procedure comprising:
acquiring at least one item of information representative of a distance between the first gateway and at least one second gateway; each item of distance information being determined on the basis of information representative of a geographical location of each second gateway received by the first gateway and having been transmitted in a frame by the respective second gateway that has measured said item of geographical location information, the respective second gateway temporarily acting as a terminal to transmit said frame; and,
when the at least one second gateway is situated at a distance from the first gateway that is shorter than a predefined distance, determining the communication parameters comprising a central frequency, said central frequency being determined by selecting, from among a set of predefined central frequencies, a central frequency located in a gap between central frequencies which are used by each second gateway situated at a distance from the first gateway that is shorter than the predefined distance, said gap being larger than a predefined gap.

2. The method as claimed in claim 1, wherein the communication parameters furthermore comprise a modulation and/or a transmit level, and in that the modulation and/or the transmit level are determined using information representative of a quality of reception, which information is measured when the uplink frame is received by the first gateway, and comprising an item of information representative of a received signal strength indication RSSI and an item of signal-to-noise ratio SNR information.

3. The method as claimed in claim 2, wherein determination of the modulation consists in selecting, from among a set of modulations, each modulation of said set being associated with a bit rate, a minimum admissible reception sensitivity and a minimum acceptable signal-to-noise ratio, a modulation associated with the highest possible bit rate and meeting each criterion from among a first and a second criteria, the first criterion being such that the item of information representative of a received signal strength indication RSSI has to be such that:

$$RSSI \geq (S+C_{RSSI})$$

where S is the minimum admissible reception sensitivity associated with said modulation and $C_{RSSI}$ is a first predefined constant and the second criterion being such that the item of signal-to-noise ratio SNR information has to be such that:

$$SNR \geq (A+C_{SNR})$$

where A is the minimum acceptable signal-to-noise ratio associated with said modulation and $C_{SNR}$ is a second predefined constant.

4. The method as claimed in claim 3, wherein, when a modulation has been able to be selected, a transmit level POWE is determined in the following way:

$$POWE = \max(N_{max} - \min((SNR - (A+C_{SNR}), (RSSI - (S+C_{RSSI})), N_{min})$$

where $N_{max}$ is a predefined maximum transmit level, $N_{min}$ is a predefined minimum transmit level, min(x,y) is a function taking the minimum between a value x and a value y, max(x,y) is a function taking the maximum between the value x and the value y.

5. The method as claimed in claim 2, wherein, prior to the transmission of the frame comprising an item of geographical location information, the respective second gateway that has to transmit said frame has implemented an identification procedure enabling the respective second gateway to identify itself to other gateways belonging to said network comprising the first gateway, said identification procedure being based on a transmission of a signature representative of the respective second gateway and able to be recognized by each other gateway of said network in the form of a predefined series of empty frames, each empty frame being transmitted with a predefined transmit level.

6. The method as claimed in claim 1, wherein communication parameters are acquired for each uplink frame transmitted by the terminal and relayed by the first gateway or at regular intervals, a duration of each interval being able to be set or adjusted depending on statistics regarding a rate of variation of characteristics of a frequency band used by said network.

7. A system comprising a first gateway, at least one second gateway and a server that are connected by a low-power wide-area wireless network based on LoRa (long range) technology, the first gateway having been designated by the server to relay information representative of a response to a request, containing data, received by the server, said data originating from a terminal of said network, the information representative of a response being transmitted by the server and intended for the terminal, wherein the first gateway comprises circuitry adapted for:
acquiring communication parameters between said first gateway and said terminal; and, configuring the first gateway so as to transmit the information representative of a response using each communication parameter acquired, the data originating from the terminal coming from an uplink frame that is transmitted in multicast mode by the terminal and received by a set of gateways comprising at least the first gateway, and the information representative of a response is transmitted by the first gateway to the terminal in a downlink frame;

implementing a determination procedure comprising:

acquiring at least one item of information representative of a distance between the first gateway and the at least one second gateway; each item of distance information being determined on the basis of information representative of a geographical location of each second gateway received by the first gateway and having been transmitted in a frame by the respective second gateway that has measured said item of geographical location information, said respective second gateway temporarily acting as a terminal to transmit said frame; and, determining the communication parameters comprising a central frequency, said central frequency being determined by selecting, from among a set of predefined central frequencies, a central frequency located in a gap between central frequencies which are used by each second gateway situated at a distance from the first gateway that is shorter than the predefined distance, said gap being larger than a predefined gap.

8. Non transitory information storage medium, storing a computer program comprising instructions for the implementation, by a device, of the method as claimed in claim 1 when said program is executed by a processor of said device.

* * * * *